United States Patent Office 3,192,254
Patented June 29, 1965

3,192,254
STABILIZATION OF PERACIDS WITH PICOLINIC ACID
Ernest R. Hayes, Shawinigan South, Quebec, Canada, assignor to Shawinigan Chemicals Limited, Montreal, Quebec, Canada, a corporation of Canada
No Drawing. Filed Oct. 19, 1959, Ser. No. 847,030
8 Claims. (Cl. 260—502)

This invention relates to the stabilization of peracetic acid. More particularly, it relates to the stabilization of solutions of refined peracetic acid and to the stabilization of solutions of crude peracetic acid in a non-reactive organic solvent, by the addition of picolinic acid.

It is generally desirable to stabilize peracetic acid in aqueous solution because it is relatively unstable and decomposes at a relatively rapid rate. Dipicolinic acid, for example, is a known stabilizer for peracetic acid aqueous solutions. Crude peracetic acid prepared by the air oxidation of acetaldehyde in a non-reactive organic solvent in presence of a metal compound catalyst is extremely unstable at room temperature or at higher temperatures. If the unstabilized crude is allowed to come to room temperature, it will start to decompose exothermically and boil quite rapidly. Thus, the unstabilized crude cannot be stored except at low temperatures; otherwise it must be rectified immediately. Furthermore, the unstabilized crude decomposes while being rectified and may create an explosion hazard. Even known peracid stabilizers such as dipicolinic acid have little or no effect on the stability of such crudes.

It is an object of the present invention to provide an effective stabilizer for peracetic acid solutions in a non-reactive organic solvent.

It is also an object of the present invention to provide an effective stabilizer for both refined peracetic acid and crude peracetic acid containing, for example, acetaldehyde, traces of metal catalyst, or acetic acid.

It is also an object of the present invention to provide a stabilizer for both refined and crude peracetic acid which is effective at elevated temperatures.

Other objects and advantages of the present invention will appear from the description to follow.

The invention broadly consists in a method of stabilizing a carboxylic peracid which comprises incorporating picolinic acid therein.

The invention also consists in a composition of matter comprising a lower molecular weight carboxylic peracid and a stabilizing amount of picolinic acid.

Crude peracetic acid can be obtained by air oxidation of acetaldehyde in a non-reactive organic solvent, for example methyl acetate, ethyl acetate, or acetone, in presence of a cobalt or copper compound catalyst. The crude solutions thus obtained usually contain 6.0–15% peracetic acid, 0.7–2.0% unreacted acetaldehyde, 1.0–2.5% acetic acid, 0.005% metal compound catalyst, 0.1–0.5% organic peroxide material, and 80–91% solvent.

It was found that picolinic acid is exceptionally effective for stabilizing such crude acid solutions, in contrast to dipicolinic acid which has very little stabilizing effect on the crude. It was found that picolinic acid is also very effective for stabilizing refined peracetic acid in a non-reactive organic solvent solution.

Picolinic acid, technically 2-pyridine carboxylic acid, differs from dipicolinic acid, 2,6-pyridine dicarboxylic acid, by having only one carboxylic acid group in its molecule in the position $\alpha$ to the nitrogen atom while dipicolinic acid has two such groups, in the $\alpha$ and $\alpha'$ positions respectively. Since the mechanism of peracid stabilization is not clear, one could not predict that the compound having one carboxylic group on the pyridine nucleus would be a stabilizer merely because the compound having two carboxylic groups on the same nucleus is a stabilizer. Still less could one predict that the reduction from two groups to one would result in a more effective stabilizer.

The amount of picolinic acid to be added as stabilizer may vary widely, depending on the stability desired in the product and on the magnitude of the factors contributing to the instability of the material. These factors include (a) the natural instability of peracetic acid, which is uniform at a specific temperature in the absence of other factors, (b) the presence of metal ions, (c) the presence of acetaldehyde, and (d) the temperature of the solution. Useful amounts are up to 1000 parts per million of solution, by weight. Generally, 250 to 750 parts per million are sufficient to ensure good stability.

EXAMPLES

The following examples, in which p.p.m. denotes parts per million, are illustrative of the invention. In these examples, room temperature defines a temperature of 20–25° C., and the percentages given are by weight.

Example 1

Three samples of 100 cc. each of a peracetic acid solution in ethyl acetate were isolated in polyethylene bottles. The peracetic acid solution contained 7.71% peracetic acid, 1.8% acetic acid, 0.7% acetaldehyde, 0.1–0.5% organic peroxide, 0.005% $CoCl_2 \cdot 6H_2O$, and balance ethyl acetate. 500 p.p.m. of picolinic acid were added to one sample while 500 p.p.m. of dipicolinic acid were added to the second one. The third 100 cc. sample was retained as reference. The three samples were loosely stoppered and stored at room temperature. The peracetic acid content of the samples was determined with the following results:

PERCENT PERACID AFTER ELAPSED TIME

| Stabilizer | \_\_\_\_ | 1 | 2 | 26 | 50 | 122 | 146 | 170 | 194 | 218 | 290 | 314 |
|---|---|---|---|---|---|---|---|---|---|---|---|---|
| Picolinic acid | \_\_\_\_ | \_\_\_\_ | 6.65 | 4.70 | 4.32 | 4.10 | 3.90 | 3.90 | 3.70 | 3.50 | 2.20 | 1.95 |
| Dipicolinic acid | \_\_\_\_ | \_\_\_\_ | 6.26 | 3.90 | 3.06 | ¹1.50 | \_\_\_\_ | \_\_\_\_ | \_\_\_\_ | \_\_\_\_ | \_\_\_\_ | \_\_\_\_ |
| Reference | \_\_\_\_ | ²6.7 | \_\_\_\_ | \_\_\_\_ | \_\_\_\_ | \_\_\_\_ | \_\_\_\_ | \_\_\_\_ | \_\_\_\_ | \_\_\_\_ | \_\_\_\_ | \_\_\_\_ |

¹ Discarded after 122 hours.
² Discarded when it began to decompose vigorously in the interval 1-2 hours.

Example 2

Three samples of 100 cc. each of a peracetic acid solution in methyl acetate were isolated in polyethylene bottles. The peracid solution analyzed 7.4% peracetic acid, 1.2% acetic acid, 1.4% acetaldehyde, 0.1–0.5% organic peroxide, 0.005% $CoCl_2 \cdot 6H_2O$, balance methyl acetate. The three samples were treated with 100, 500, and 1,000 p.p.m. picolinic acid respectively, and stored at room temperature. Periodic analyses were performed on the samples for peracetic acid content with the following results:

| Picolinic acid (p.p.m.) | Percent Peracid after elapsed time | | | | |
|---|---|---|---|---|---|
| | 0 hours | 17 hours | 41 hours | 113 hours | 161 hours |
| 100 | 7.38 | 4.07 | 3.27 | 1.90 | 0.68 |
| 500 | 7.38 | 4.35 | 3.96 | 3.93 | 3.79 |
| 1,000 | 7.38 | 4.35 | 3.96 | 4.01 | 3.79 |

Example 3

A crude peracetic acid solution in ethyl acetate was tested for stability at elevated temperature. The crude analyzed 7.4% peracetic acid, 0.9% acetic acid, 1.8% acetaldehyde, between 0.1 and 0.5% organic peroxide, traces of $CoCl_2 \cdot 6H_2O$, and balance ethyl acetate. Two samples of 66 cc. each of this crude were isolated in loosely stoppered polyethylene bottles, and stabilized with 500 p.p.m. of picolinic acid (0.33 ml. of solution in acetic acid, 0.1 g. per ml.) and dipicolinic acid (1.66 ml. of solution in acetic acid, 0.02 g. per ml.; prepared by heating the acetic acid to accelerate rate of solution), respectively. The two stabilized samples were brought to 45–50° C. and maintained at that temperature for four hours, then stored at room temperature. They were periodically analyzed for peracetic acid content. The results were as follows:

| Stabilizer | Percent peracid after elapsed time | | | | |
|---|---|---|---|---|---|
| | 0 | 2 hours | 4 hours | 69 hours [1] | 93 hours [2] |
| Picolinic acid | 7.4 | 4.1 | 4.0 | 4.1 | 4.0 |
| Dipicolinic acid | 7.5 | 3.5 | 3.4 | 3.4 | 3.3 |

[1] This period included 65 hours at room temperature.
[2] This period included 89 hours at room temperature.

Example 4

A sample of 100 cc. of rectified peracetic acid solution was isolated in a loosely stoppered polyethylene bottle. The peracid solution analyzed 22.7% peracetic acid, 10.9% acetic acid, 1–3% organic peroxide, balance ester. The ester was predominantly methyl acetate, with less than 10% ethyl acetate. 260 p.p.m. of picolinic acid were added as a solid to the sample. An identical 50 cc. sample was isolated without addition of picolinic acid, and retained as reference. Both samples were allowed to come to room temperature. Periodic analyses for peracetic acid content, at the times indicated, gave the following results:

PERCENT PERACID AFTER ELAPSED TIME

| Stabilizer | Time (hrs.) | | | | | | | | | |
|---|---|---|---|---|---|---|---|---|---|---|
| | 19 | 43 | 96 | 164 | 212 | 428 | 528 | 930 | 1271 | 1795 |
| Picolinic Acid | 22.0 | 21.7 | 20.9 | 19.8 | 18.7 | 17.0 | 16.4 | 13.0 | 9.3 | 4.2 |
| Reference | 21.4 | 20.4 | 18.5 | 15.7 | 14.6 | [1] 5.2 | | | | |

[1] This sample was discarded after 428 hours.

The foregoing examples are given by way of illustration only, and do not limit the scope of the invention. Thus other peracids, for example perpropionic acid, can be stabilized with picolinic acid. It is preferred to use picolinic acid as the pure acid. However, salts of picolinic acid which are soluble in the solvent used can also serve as stabilizers.

It will be understood that many other variations of this process may be made without departing from the invention which is as defined in the following claims.

I claim:

1. A composition of matter comprising peracetic acid, in at least one solvent for peracetic acid selected from the group consisting of acetic acid, methyl acetate, and ethyl acetate, and a stabilizing amount of picolinic acid.

2. A composition of matter according to claim 1 in which the picolinic acid is present in an amount of up to one thousand parts per million of solution.

3. A process for stabilizing peracetic acid in solution in at least one solvent for peracetic acid selected from the group consisting of acetic acid, methyl acetate, and ethyl acetate which comprises incorporating a stabilizing amount of picolinic acid in said peracetic acid solution.

4. A process as claimed in claim 3, in which the peracetic acid solution is crude peracetic acid prepared by oxidation of acetaldehyde with an oxygen containing gas in said solvent and in the presence of a metal salt catalyst of the group consisting of salts of cobalt and copper.

5. A process according to claim 3, in which the organic solvent is ethyl acetate.

6. A process in accordance with claim 3 in which the solvent is acetic acid.

7. A process according to claim 3 in which the solvent is methyl acetate.

8. A process according to claim 3 in which the picolinic acid is present in an amount of up to one thousand parts per million of solution.

References Cited by the Examiner

UNITED STATES PATENTS

| Re. 25,057 | 10/61 | Stevens. |
| 2,347,434 | 4/44 | Reichert et al. |
| 2,609,391 | 9/52 | Greenspan et al. _____ 260—502 |
| 2,624,655 | 1/53 | Greenspan _____ 237—207.5 |

FOREIGN PATENTS

| 716,077 | 9/54 | Great Britain. |

LORRAINE A. WEINBERGER, *Acting Primary Examiner.*

LEON ZITVER, CHARLES B. PARKER, *Examiners.*